United States Patent [19]

Reich

[11] Patent Number: 4,640,589

[45] Date of Patent: Feb. 3, 1987

[54] MICROSCOPE ILLUMINATOR

[75] Inventor: William N. Reich, San Mateo, Calif.

[73] Assignee: Spectrolyte, Inc., San Mateo, Calif.

[21] Appl. No.: 836,713

[22] Filed: Mar. 3, 1986

Related U.S. Application Data

[62] Division of Ser. No. 464,961, Feb. 8, 1983, abandoned, which is a division of Ser. No. 405,253, Aug. 4, 1982, abandoned.

[51] Int. Cl.$^4$ .............................................. G02B 21/24
[52] U.S. Cl. ................................................... 350/523
[58] Field of Search ............... 350/397, 404, 523, 524, 350/528; 356/417

[56] References Cited

U.S. PATENT DOCUMENTS 2,667,103  1/1954  Silge ..................................... 350/523
3,933,408  1/1976  Reinert ................................. 350/523

OTHER PUBLICATIONS

Yakubenas et al., "Surgical Contact Microscope", Soviet Journal of Opt. Tech., vol. 38, No. 1, Jan. 1971.

*Primary Examiner*—John K. Corbin
*Assistant Examiner*—Vincent J. Lemmo
*Attorney, Agent, or Firm*—Jerry W. Berkstresser

[57] ABSTRACT

A microscope illuminator containing an incandescent point source of illumination, an aspheric lens with heat absorbing characteristics defining an optical path for the illumination, a cut-off filter and a rotatable dichroic interference filter capable of being moved into the optical path of the illumination and capable of polarizing light as its angle of incidence with respect to the optical path is varied, a condensing lens and a rotatable mirror for receiving the polarized illumination from the dichroic filter and altering the optical path to coincide with the optical axis of a microscope. Additional filters are optionally provided.

3 Claims, 5 Drawing Figures

MICROSCOPE ILLUMINATOR

This is a division of application Ser. No. 464,961 filed Feb. 8, 1983 which is a division, Ser. No. 405,253 filed Aug. 4, 1982, both now abandoned.

BACKGROUND OF THE INVENTION

This invention relates to devices for illuminating a specimen to be viewed through a microscope and more particularly to a device which will adjustably filter and polarize the light used for illumination so as to provide simply for the enhanced viewing of fluorescense.

Advances in medical research have provided the health care provider with an ever increasing number of analytical and diagnostic tools which are indispensable aids in arriving at a proper diagnosis of conditions and ailments. Of particular interest here is the growing use of immunoassay analytical techniques. Body fluids, serums and the like can now be tested for the presence of immune complexes by reacting the fluid with a highly specific protein to absorb the immune complex, if present, and subsequently conducting a further reaction with a reactant, such as anti-human IgG coupled with an enzyme, as with the ELISA technique, or by fluorescence-immunoassay (FITC). The foregoing, referred to as the ELISA assay, is described in *The Enzyme Linked Immunosorbent Assay* by Bidwell and Bartlett (1979); the latter in *"FLUOR-ANTIBODY MICROSCOPY"* by William B. Cherry, Ph.D; USDHEW, Center for Disease Control, Atlanta, Ga.-June, 1977.

A wide variety of fluorochromes have been employed which when reacted will produce conjugates which fluoresce when excited by specific wave lengths of light, particularly in the near-ultraviolet. The presence, then, of a particular visible color of fluorescence will indicate the presence and amount of immune complex present originally in the sample being analyzed. Microscope equipment has been available for such analytical work which has enabled the laboratory to successfully assay many of the immune complexes identified as useful for diagnosis of a wide variety of conditions. Some instruments have been developed to provide for a spectrophotometric measurement of emission fluorescence, results of which can be quantitatively correlated to presence of certain immune complexes. Other equipment, currently employed in immunofluorescence work, is characterized as "integrated" and "unimodular" and is uniformly sophisticated and extremely expensive. However, since the singular requirement for qualitative estimations is in the production of the distinctive type of fluorescence, it has been desirable for there to be a special, properly filtered energy source that can independently operate with any existing microscope for viewing immunofluorescent preparations. Such a device would be extremely useful for the clinical laboratory and research lab facility. The illuminator of the present invention fits such criteria in that it is not unimodular nor integrated with any specific microscope, and may be employed interchangeably with any commonly available microscope. Further, a less expensive article of laboratory equipment for these assays is desirable in order to contribute to the containment of health care costs while providing service which is consistent with the state of the art.

It is therefore an object of the present invention to provide an improved, low cost microscope illuminator adaptable to most microscopes for viewing immunoflourescence, and to provide novel structure for the illuminator so as to improve the ability, and therefore the accuracy, of average laboratory personnel to visually distinguish the particular fluorescence from the variety of colors and background light which can be observed in particular samples.

SUMMARY OF THE INVENTION

The microscope illuminator of the present invention comprises, in a coherent optical path, a point light source, a heat absorbing filter and a primary aspheric lens, a multiplicity of preselected cut-off filters arranged to be selectively inserted into the optical path of the illumination, a preselected narrow band pass dichroic filter mounted for lateral rotation about and through the axis of the optical path and sized so as to be capable of completely filling the optical path when laterally perpendicular thereto and capable of being displaced angularly in said path to achieve one of the objects of the present invention through a complete 180° or 360° rotation for the visual effect sought. The optical pathway beyond the dichroic filter further contains a secondary condensing lens and a tiltable mirror to adjustably turn the optical axis generally upwardly through the specimen being viewed and into the optical axis of the objective lens of a microscope.

In another embodiment of the present invention, an additional dichroic filter can be placed in the optical path of the illumination either between the source of the illumination and the secondary condensing lens or in conjunction with the tiltable mirror, as for example in the optical path between the mirror and the specimen, to achieve even further enhancement of the desired black background for greater contrast when viewing fluorescent specimens.

DETAILED DESCRIPTION OF THE INVENTION

Figure 1:
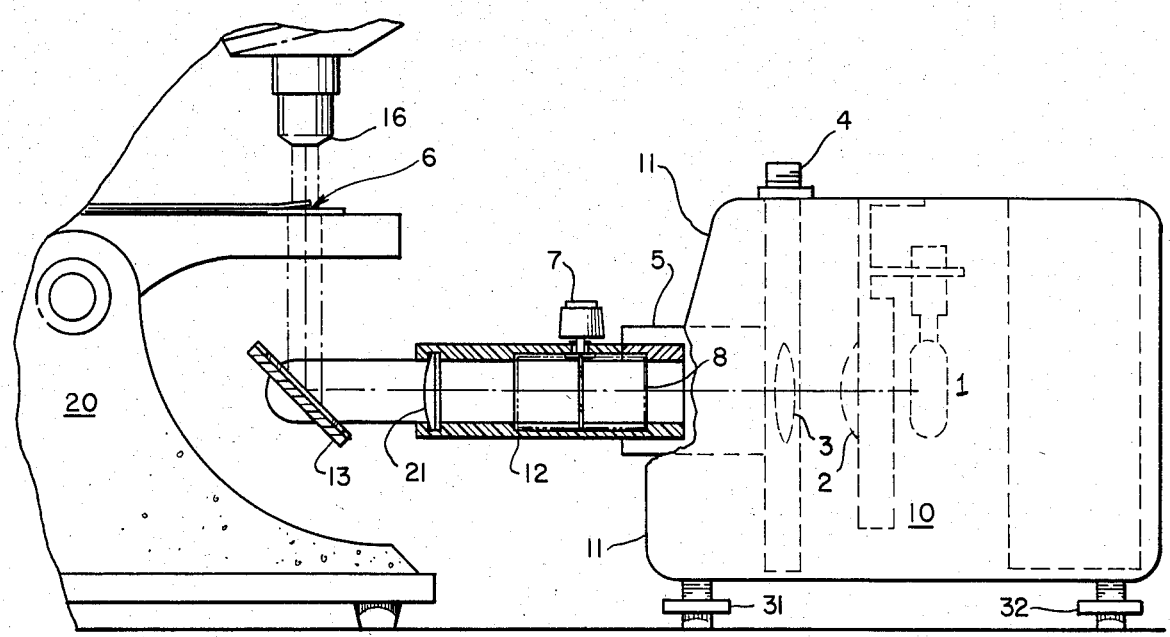
FIG. 1 is a partially sectioned, fragmentary side elevation, partially in phantom of the Microscope Illuminator of the present invention showing the optical pathway for the illumination.

As described hereinbefore, a specimen 6 which is to be examined microscopically using the illuminator of the present invention is conventionally prepared and placed for examination in the optical path of a conventional microscope which is suitable for the observations required. The illuminator housing 10 contains a point source of illumination, lamp 1, a primary aspheric lens 2, and a filter 3 housed in a rotating filter mount 4. Housing 10 has slideably received in its front face 11 a hollow four-sided optical guide 12 positioned in the path of the illumination which has passed through the filter 3 and is provided thereon with a mirror 13 which is rotatably received on the distal end of the optical guide 12 and positioned underneath the specimen holder or stage 15 of the microscope and is rotatable to adjustably direct the illumination from the guide 12 through the specimen 6 and onto the objective lens 16 of the microscope 20.

The optical guide 12 is provided near its distal end with a 2° condensing lens 21 prepositioned to concentrate the illumination from the housing 10 onto the mirror 13. The entire housing 12 is received in a mounting fixture 5 which is attached to the front face of the housing 10 and in line with the optical axis of the illumination coming from the point source of illumination. The housing 12 can also be mounted directly into the front of the housing 10, if desired, by simply providing the housing with a rectangular cut-out of the correct size. Intermediate the face 11 of the housing 10 and the condensing lens 21, the guide 12 is provided with a rotatable knob 7 which is attached inside of the guide 12 to the top of optical element 8 at its center. The element 8 is sized to substantially fill the cross-sectional area of the guide 12 when by the rotation of knob 7 it is laterally rotated so that the dichroic filter can be angularly displaced with respect to the optical axis of the illumination i.e. it can be placed completely or only partially in the optical path of the illumination passing from the interior of the housing 10 to the condensing lens 21 and mirror 13. The optical element 8 is preferably selected from the variety of dichroic interference type filters available commercially which are capable of narrow band pass filtration and polarization when rotated to change the angle of incidence of the filter with respect to the optical axis of the illumination. Exemplary of the kind of element that is preferably selected which is useful for immunoassay testing employing fluorochromes is a so-called blue-pass filter having the property, when properly oriented, of characteristically permitting a narrow band of wave lengths of light around 4950 angstroms to pass from the source of the illumination to the condensing lens and mirror of the illuminator and then on through the specimen and into the objective lens of the microscope. There are several suppliers of dichroic mirrors and filters that supply transparent glass articles having vacuum coated thereon various thicknesses of coating of metal oxides, aluminum, gold, silver, tungsten, antimony and the like, to produce selectively different optical and filtration characteristics. For example, a wide variety of such materials are available from Optical-Coating Laboratories of Santa Rosa, Calif. and Schott Optical of New York City. In addition to the optical element 8 a rotating filter mount 4 is provided for rotation about an axis in the housing parallel to the optical axis where at least one filter 3 is mounted on the mount 4 in a manner to be placed in registry with the optical path of the light. Preferably in addition to an unfiltered opening, a plurality of filters are mounted such that a variety of filtration functions can be provided by the use of preselected filtration characteristics for each filter. Such filters can also be obtained from the aforementioned suppliers. The filters to be used can be single filters or combinations of filters sandwiched together for superior results. In addition to dichroic filters, other types of filters can be employed alone or together with preselected dichroic filters which also can be used alone or with one or more dichroic filters.

The function of optical element 8 is to receive the illumination from the lamp in housing 10 and by preselection of an appropriate incident angle of the element with respect to the illuminating beam produced by the lamp to provide in a predetermined manner varying contrast between the background illumination of the specimen when viewed through the microscope.

Figure 4:
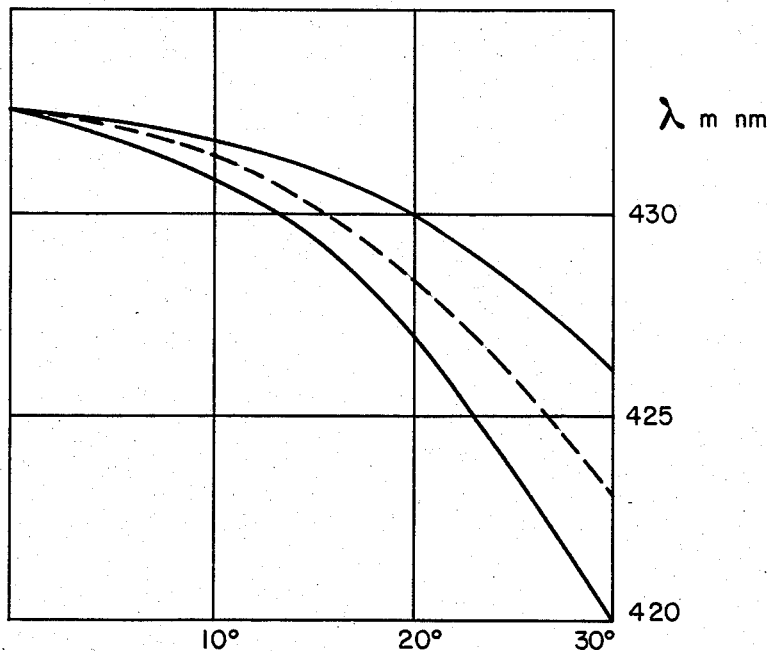
FIG. 4 is a graph showing the degree of splitting of light at the wavelengths shown into perpendicular and parallel polarized light as a function of the change in the angle of incidence of a dichroic filter with respect to the optical axis of the illuminator.

Referring to FIG. 4 the polarizing ability of such a filter is shown where the shift of wave length in one or another direction from the dotted median line is a function of the angle of incidence. The following equations hold for the splitting (s) into perpendicular and parallel polarized light, and the displacement (D) of the nm wave length transmission maximum (in nanometers) as a result of the incremental changes in the angle of incidence $\theta$.

$$D = K \sin^2\theta \text{ and}$$

$$S = 17 \sin^2\theta$$

In the foregoing equations K is a constant that is dependent on wave length but is essentially the same value for all filters of this type.

TABLE 1

| | Wave Length Displacement (D) in mm for the various values of "nm" | | | | | | | | |
|---|---|---|---|---|---|---|---|---|---|
| $\theta$ | 400 nm | 450 nm | 500 nm | 550 nm | 600 nm | 650 nm | 700 nm | 750 nm | S in nm |
| 5° | 0,2 | 0,3 | 0,4 | 0,4 | 0,5 | 0,5 | 0,6 | 0,6 | 0,1 |
| 10° | 1 | 1 | 2 | 2 | 2 | 2 | 2 | 2 | 0,5 |
| 15° | 2 | 3 | 3 | 4 | 4 | 5 | 5 | 5 | 1 |
| 20° | 3 | 5 | 6 | 7 | 8 | 8 | 9 | 9 | 2 |
| 25° | 5 | 7 | 9 | 10 | 12 | 13 | 13 | 14 | 3 |
| 30° | 7 | 10 | 12 | 14 | 16 | 18 | 19 | 20 | 4 |

In addition to the foregoing table, it should be noted that the value for nm may be displaced by several nm without practical change in the band pass characteristics of the filter. With increased inclination the band pass may be broadened. As previously described these characteristics are accommodated in the present invention by the use of the proper preselected cut-off filter characteristics for the filters on the filter wheel 4.

Figure 2:
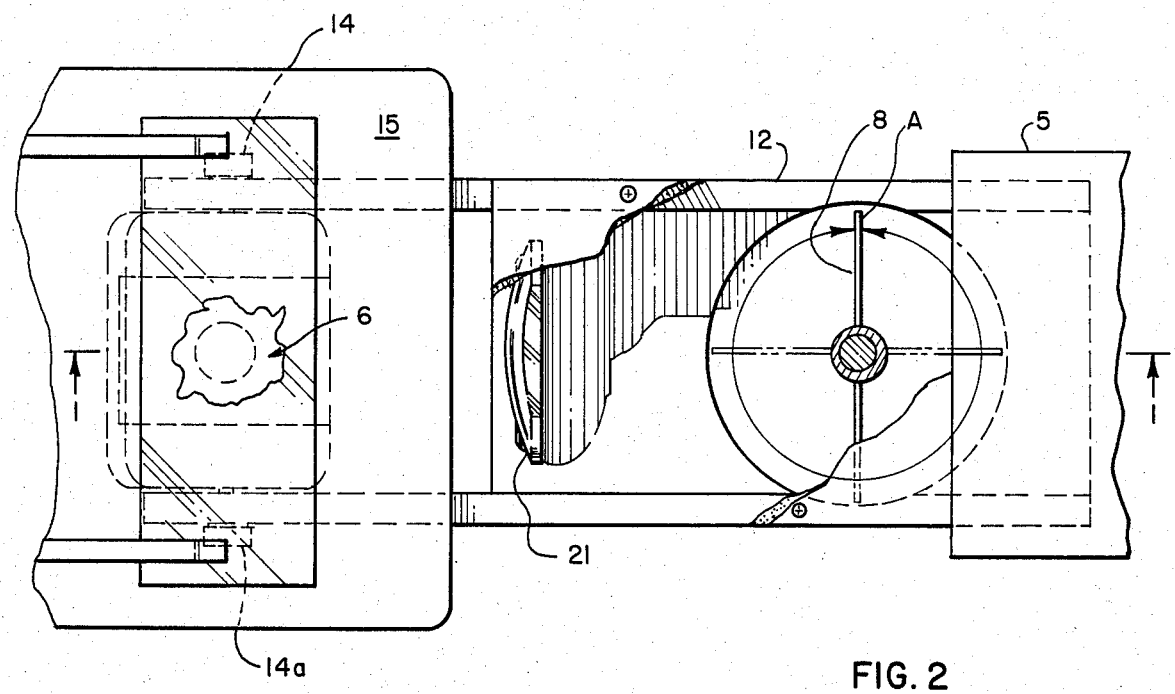
FIG. 2 is a fragmentary partially broken plan view of the snorkel-like housing projecting from the front of the Microscope Illuminator of the present invention.
Figure 3:
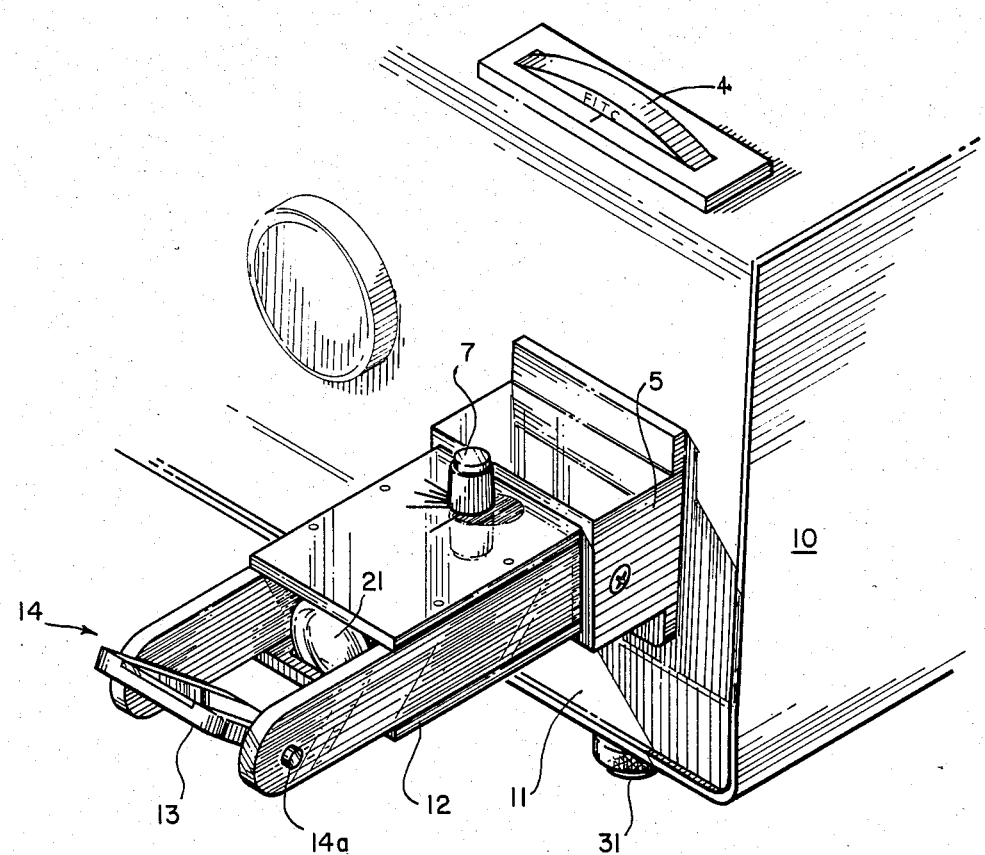
FIG. 3 is a fragmentary perspective view of the housing of the Illuminator of the present invention showing the snorkel-like projection therefrom.

The optical element 8 is sized to completely fill the optical path provided by the guide 12 when in the position shown at A in FIG. 2. It is affixed to the shaft of the rotatable knob 7 so that turning the knob 7, while viewing the specimen 1 through the microscope, will alter the angle of the incident light striking the element 8 and provide for different optical characteristics in the light transmitted through the element which is used for viewing the specimen. The element 8, as previously described, is preferably sized so as to fit into the precut recesses in both the internal lateral-walls of the guide 12, as well as the roof and floor of the guide, shown in detail in FIGS. 1 and 2. In this manner the unwanted edge effects, which would normally introduce spurious light having other than the desired optical characteristics, are minimized. Likewise, the mounting of the element 8 to the shaft of knob 7 is received in a recess in the roof of the guide so that it does not interfere with the optical pathway provided by the walls of the guide 12.

The condensing lens 21 is positioned at a predetermined location in the guide 12 between the optical element 8 and the adjustable mirror 13, so as to focus the light transmitted through the optical element onto the mirror 13. The mirror 13 is rotatably mounted between the lateral walls of the guide 12 so that the light impinging on the mirror can be adjustably directed through the specimen and onto the objective lens 16 of a microscope. The knobs 14 and 14a are threadably received into the mounting for the mirror 13 so that they can be tightened to preserve the proper adjustment or loosened to make a change in the angle of the mirror. Likewise, the housing 10 is provided with three adjustable leveling feet 31, 32 (one not shown) which are capable of raising or lowering the housing 10. In this manner the proper optical path geometry for a variety of types of microscopes can be provided, thus increasing the versatility of the illuminator.

The operation of the lamp itself is also very important to achieving the overall objects and advantages of the present invention.

Circuitry is provided which transforms 110 v. A.C. from a conventional power line to 24 v. with the capacity for adjustment of that voltage up or down a predetermined amount to provide for viewer's retinal comfort. An L.E.D. display of the voltage selected is also provided so as to relate the voltage applied to the selected G.E. FDS/DZE 150 w. 24 v. quartz halogen bulb, to the intensity of the light emitted at predetermined wave lengths. In this manner the illuminator can be adjusted to emit adequate, comfortably viewable light emission at the proper wavelengths for the fluorochrome being used in the specimen. Spurious light is filtered by the selection of the proper filter 3 housed in wheel 4 and the observable background for the specimen is adjusted for the proper contrast between the fluorescence emitted from the specimens so that a highly reliable analytical judgment can be made concerning the material being assayed.

Figure 5:
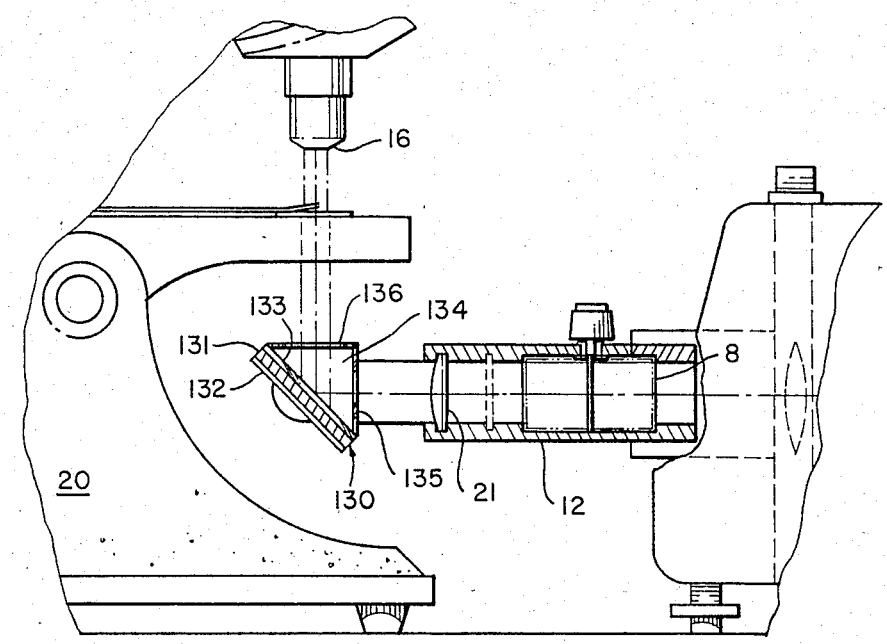
FIG. 5 is a partially sectioned fragmentary side elevation, partially in phantom of the Microscope Illuminator of the present invention as shown in FIG. 1, with alternative embodiments of the invention shown.

Referring to FIG. 5, improved contrast is achieved by replacing the mirror 13 with a structure 130 which contains a mirror support 131, mirrors 132 and 133, and triangular side walls 134 having mounted thereon a clear glass face 135 and a dichroic filter 136. The preferred dichroic filter selected for this embodiment, as previously described, is a OCLI blue-poss filter at 495 mu. The second mirror 132 is provided for white light microscopy.

Alternatively, a dichroic filter can be removably inserted into the optical path by mounting either directly on the microscope or in the snorkel projection such as is shown in dotted lines in FIG. 5.

In addition to the foregoing, it has been found that particularly advantageous results can be obtained with the embodiments shown in FIG. 5 and described herein to provide at least one filter on the filter wheel in FIG. 1 with three dichroic filter sheets.

The apparatus described herein will provide a sufficient amount of illumination at the proper wavelengths for the fluorochromes typically used in the specimens, e.g. acridine orange, rhodamine, fluorescein and the like, and the provision of an optical element 8 which is rotatable, as previously described, as well as the additional filter means disclosed then provides a means for further enhancement of the visible fluorescence from the specimen by providing the capability for varying the visual contrast between the induced fluorescence and the non-fluorescing background.

It has been determined that this device provides an alternative for laboratory personnel to immunofluorescence analyses and without the need for more costly equipment.

The foregoing description of the preferred embodiment of the present invention is exemplary of a device which will perform as described. Changes can be made in the specific configuration of components and optical elements within the spirit of the hereinafter claimed patentable invention which is limited in its scope only by the prior art.

What is claimed is:

1. A microscope illuminator comprising:
   a point source of illumination including an incandescent bulb and means for increasing the intensity of illumination from said point source by varying the voltage applied to said point source of illumination;
   an aspheric lens capable of blocking infrared radiation from said point source of illumination and directing the illumination from said point source along a predetermined optical path;
   a narrow band pass dichroic filter mounted for rotation about an axis perpendicular to the optical path of illumination to permit only a limited plurality of wavelengths of radiation along the optical path and capable of transmitting a preselected plurality of wave lengths along the pathway; and
   means for adjustably directing the resulting radiation substantial normal to the pathway so as to be able to be directed onto and through a specimen to be observed in a position to be viewed by a microscope.

2. A microscope illuminator for improving the dark background during immunofluorescence assays while providing wavelengths of ultraviolet radiation suitable for excitation of predetermined fluorochromes in such assay comprising:
   means for providing an optical path from a quartz halogen incandescent bulb source of illumination including ultraviolet radiation, to the objective lens of a microscope and including in said optical path;
   an aspheric lens in the optical path capable of attenuating infrared radiation from said incandescent bulb and directing the illumination and ultraviolet radiation along said optical path;
   filter means in the optical path for selectively permitting a plurality of wavelengths including ultraviolet radiation along a pathway;
   a narrow band pass dichroic filter mounted for rotation about an axis perpendicular to the optical path for permitting only a limited plurality of wavelengths of radiation along the pathway in a manner to adjustably facilitate excitation of preselected fluorochromes in immunofluorescence assays while attentuating visible light; and
   means for focusing the resulting radiation components in the optical path so as to be capable of being directed onto and through a specimen to be observed in a position to be viewed by a microscope for immunofluorescence assay; and
   electrical means for increasing the intensity of illumination from said bulb by varying the voltage applied to said bulb.

3. A method for exciting fluorescence from a specimen containing a preselected fluorochrome during an immunofluorescence assay procedure while attenuating the visible background comprising the steps of:
   illuminating an incandescent source of illumination which includes an ultraviolet component;
   directing the illumination along at least one optical path;

filtering the illumination in the optical path to pass preselected wavelengths in the ultraviolet;

a narrow band pass dichroic filter mounted for rotation about an axis perpendicular to the optical path to restrict the illumination in the pathway to a preselected limited plurality of wavelengths by the rotation of said dichroic filter to change the angle of incidence between the illumination in the optical path and the dichroic filter thereby providing a dark background during the immunofluorescence assay while providing sufficient ultraviolet radiation for excitation of the fluorochromes present in the assay specimen;

focusing and directing the resultant illumination through a specimen placed in the optical axis of a microscope.

* * * * *